3,161,633
ACETYLACETOARYLIDE DISAZO PIGMENTS
Maurice Auguste Jacques Lenoir, Paris, and Michel Maigrot, Piscop, France, assignors, by mesne assignments, to Etablissements Kuhlmann, Paris, France, a corporation of France
No Drawing. Filed June 4, 1962, Ser. No. 199,634
Claims priority, application France, June 9, 1961, 864,386; Jan. 13, 1962, 884,761
1 Claim. (Cl. 260—176)

The present invention relates to new disazo pigments.

The manufacture of disazo dyestuffs by coupling tetrazo derivatives of diphenyl diamines with acetylacetarylides is well known. The first dyestuffs of this type made the subject of the German Patent No. 251,479 of May 11th, 1911. They are derived from 4,4'-diamino-3,3'-dichlorodiphenyl, the tetrazo derivative of which is coupled with acetylacetanilide or its homologues.

These disazo compounds, commonly called "benzidine yellows," have found considerable use as pigments in the preparation of printing inks and in the colouration of rubber. Analogous pigments of an orange shade, are also known which result from coupling the tetrazo derivative of 4,4'-diamino-3,3'-dimethoxy-diphenyl with acetylacetanilide or its homologues.

These yellow and orange pigments, very common at the present time, are not however suitable for all applications. Their uses are often limited by their lack of fastness to light, their insufficient resistance to certain solvents and, above all, by their migration in plastic materials, especially in plasticised polyvinyl chloride. On the other hand, their range of shades is rather limited.

It has now been found that valuable pigments are obtained by coupling the tetrazo derivative of a diamine of the formula:

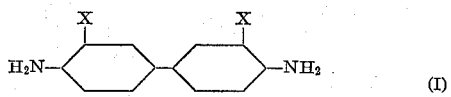

in which X represents a member selected from the group consisting of hydrogen atoms, chlorine atoms, methyl groups and methoxy groups with two molecules of an acetylacetarylide of the formula:

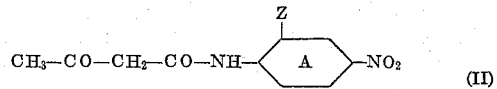

in which Z represents a member selected from the group consisting of chlorine atoms, methyl groups and methoxy groups.

The pigments of the present invention may be represented by the general formula:

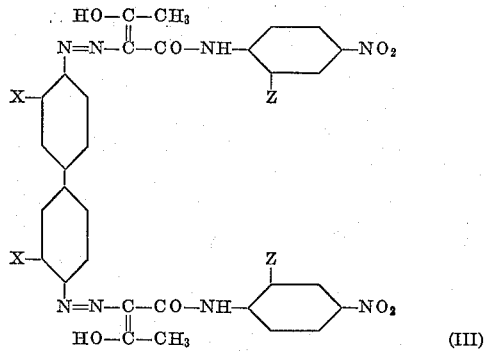

in which X and Z have respectively the same significance as above. These are yellows, oranges and reds, whose resistance to migration and to solvents is excellent and the fastness of which to light is in general very good. These new pigments are suitable for the same applications as the benzidine yellow and in addition are particularly suitable for the colouration of plastic materials and for pigmentary printing on textiles.

Most of the acetylacetarylides used for the preparation of these new pigments are themselves new products. They are obtained in the form of crystalline powders possessing the following characteristics:

| N-acetylacetylated derivative of— | Colour | Melting point, °C. |
|---|---|---|
| 4-nitro-2-chloro-1-aminobenzene | Clear yellow | 136.5 |
| 4-nitro-2-methyl-1-aminobenzene | Yellow | 124 |
| 4-nitro-2-methoxy-1-aminobenzene | do | 118 |

These compounds may be prepared by acetylacetylation of the corresponding amines, either by means of an ester of acetylacetic acid, or by means of diketene. Nevertheless, the method using ethyl acetylacetate leads to mediocre yields in the case of the nitro-arylamines. It is then preferable to use the diketene according to the process described for the acetylacetylation of o-nitraniline by Perekalin and Lerner (Zurnal obsecej Himii, 1951, pages 1995 to 2001). This process comprises reacting the diketene at low temperature with the nitro-arylamine in solution in acetone in the presence of pyridine. After reaction and evaporation of the acetone, the residue is dissolved in a dilute solution of sodium hydroxide, The solution obtained is clarified by filtration and the N-acetylacetylated derivative of the nitroarylamine is precipitated from the filtrate by means of carbon dioxide.

The following examples, in which the parts are parts by weight, illustrate the present invention.

*Example 1*

25.3 parts of 4,4'-diamino-3,3'-dichlorodiphenyl are made into a paste with 300 parts of water and 73 parts of 30% hydrochloric acid. After stirring for three hours, ice is added and it is tetrazotized by adding a concentrated aqueous solution of 14 parts of sodium nitrate. The solution of the tetrazo derivative is clarified by filtration. On the other hand, 53 parts of the N-acetylacetylated derivative of 4-nitro-2-chloro-1-aminobenzene are dissolved in 600 parts of water at 20° C. with 8.8 parts of sodium hydroxide. 0.4 part of polyethoxylated dodecyl alcohol are added, then a solution of 11.5 parts of formic acid in 240 parts of water is slowly introduced while stirring. The suspension thus obtained is treated with 28 parts of sodium formate and the temperature is raised to 60° C. While maintaining this temperature, the solution of the tetrazo derivative is introduced into the suspension, with effective stirring, over a period of 2 to 3 hours. When the coupling is completed, the reaction product is heated to 95–100° C. and maintained at this temperature for two hours. The pigment is filtered off, washed, and dried at 65° C. 74 parts of a yellow powder are obtained.

When applied without blending in a nitrocellulose varnish, this pigment has a yellow orange shade. When applied in the same varnish mixed with titanium oxide (5 parts of $TiO_2$ to one part of pigment) it has a slightly reddish, intensely bright yellow shade. This pigment disperses well in polyvinyl chloride plasticised with dioctylphthalate, which it colours bright yellow; it does not show any tendency to migration. Its fastness to light is very good.

*Example 2*

A solution of 49 parts of the N-acetylacetylated derivative of 4-nitro-2-methyl-1-aminobenzene in 600 parts of water at 20° C. together with 8.8 parts of sodium hydroxide is prepared. After adding 0.5 part of polyethoxylated dodecyl alcohol, a solution of 11.5 parts of formic acid in 250 parts of water is gradually introduced while stirring. 28 parts of sodium formate are added, then the mixture is heated to 55° C. While maintaining this temperature, a solution of the tetrazo derivative of 4,4'-diamino-3,3'-dichloro-diphenyl identical with that of Example 1 is introduced in two hours into the stirred suspension. When the coupling is complete, the reaction product is heated at 95° C. for two hours. After filtering off, washing and drying at 60° C., 71 parts of pigment are obtained.

This pigment has without mixing a beautiful golden yellow shade in a nitrocellulose varnish. When mixed with 5 parts of titanium oxide to 1 part of pigment, it is an intensely bright yellow. This same pigment disperses well in the polyvinyl chloride plasticised with dioctyl phthalate, to which it imparts a bright yellow colour endowed with good fastness to light and having no tendency to migration. It also colours rubber bright yellow, in which it does not migrate.

*Example 3*

The quantity of 4,4'-diamino-3,3'-dimethoxy-diphenyl sulphate corresponding to 24.4 parts of the base is made into a paste in 300 parts of water. After stirring for some hours, 48.6 parts of 30% hydrochloric acid are added, then the mixture is cooled to 0° C. by addition of ice and tetrazotized at this temperature by rapidly adding a concentrated aqueous solution of 14 parts of sodium nitrite. Then again, a suspension identical with that in Example 2 and containing the same adjuvants is prepared from 49 parts of the N-acetyl-acetylated derivative of 4-nitro - 2 - methyl-1-aminobenzene. This suspension, to which has been added 28 parts of sodium formate, is raised to a temperature of 55° C. While maintaining this temperature, the solution of the tetrazo derivative of 4,4'-diamino-3,3'-dimethoxy-dephenyl, previously clarified by filtration, is introduced in about two hours with efficient stirring. When the coupling is complete, the reaction mixture is heated at 95° C. for two hours. After filtering off, washing and drying at 60° C., 70 parts of pigment are obtained.

This pigment disperses well in polyvinyl chloride plasticised with dioctyl phthalate, which it colours orange red and in which it does not migrate. Its fastness to light is good. It also colours rubber orange red and does not migrate either in this material. In a nitrocellulose varnish this same pigment, in its full shade, is scarlet and yellowish red by mixing with titanium oxide.

*Example 4*

As described in Example 3, the tetrazo derivative of 4,4'-diamino-3,3'-dimethoxy-diphenyl, corresponding to 24.4 parts of base, is prepared. Then 53 parts of the N-acetylacetylated derivative of 4-nitro-2-chloro-1-aminobenzene are dissolved in 600 parts of water at 20° C. together with 8.8 parts of sodium hydroxide. The solution is treated with 40 parts of sodium formate and 0.4 parts of polyethoxylated dodecyl alcohol. The filtered solution of the tetrazo derivative is introduced into this solution at 20° C. in about two hours with effective stirring. The coupling is followed by heating at 95—100° C. for two hours. The pigment is filtered off, washed and dried. 72 parts of an orange powder are obtained.

In a nitrocellulose varnish this pigment is red orange in the full shade and intense yellow orange on mixing with titanium oxide. It colours plasticised polyvinyl chloride and rubber bright orange and shows no tendency to migration in these materials.

On operating according to the general process of the preceding examples, the disazo pigments are prepared, of which the table below indicates the composition and the shade.

| Ex. | Tetrazo compound | Coupling component N-acetylacetylated derivative of— | Shade on polyvinyl chloride |
|---|---|---|---|
| 5 | 4,4'-diamino-3,3'-dichloro-diphenyl. | 4-nitro-2-methoxy-1-aminobenzene. | Orange yellow. |
| 6 | 4,4'-diamino-3,3'-dimethoxy-diphenlyl | ----do-------------- | Brown red. |
| 7 | 4,4'-diamino-diphenyl | 4-nitro-2-chloro-1-aminobenzene. | Orange red. |
| 8 | 4,4'-diamino-3,3'-dimethyl-diphenyl. | ----do-------------- | Orange. |
| 9 | 4,4'-diamino-diphenyl | 4-nitro-2-methyl-1-aminobenzene. | Brown orange. |
| 10 | 4,4'-diamino-3,3'-dimethyl-diphenyl. | ----do-------------- | Orange yellow. |
| 11 | 4,4'-diamino-diphenyl | 4-nitro-2-methoxy-1-aminobenzene. | Yellow orange. |
| 12 | 4,4'-diamino-3,3'-dimethyl-diphenyl. | ----do-------------- | Do. |

We claim:
Disazo pigments of the formula:

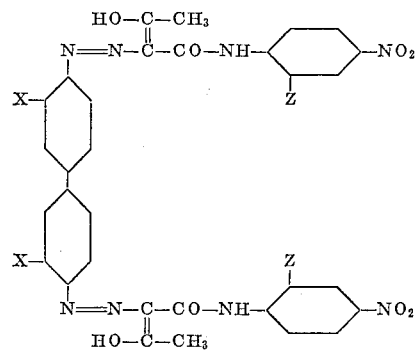

in which X represents a member selected from the group consisting of hydrogen, chlorine, methyl and methoxy and Z represents a member selected from the group consisting of chlorine and methyl.

References Cited by the Examiner
UNITED STATES PATENTS 1,932,577 10/33 Eichwede et al. -------- 260—176
2,100,378 11/37 Carr et al. ----------- 260—176

CHARLES B. PARKER, *Primary Examiner.*